United States Patent [19]

Latta, Jr. et al.

[11] 4,234,346
[45] Nov. 18, 1980

[54] HIGH STRENGTH MODIFIED ASPHALT PAVING COMPOSITION

[75] Inventors: Laurence Latta, Jr., Portola Valley; John B. Leonard, Jr., Hillsborough, both of Calif.

[73] Assignee: Chem-Crete Corporation, Menlo Park, Calif.

[21] Appl. No.: 963,293

[22] Filed: Nov. 24, 1978

Related U.S. Application Data

[63] Continuation-in-part of Ser. No. 780,862, Mar. 24, 1977, abandoned.

[51] Int. Cl.² ............................................. C08L 95/00
[52] U.S. Cl. .......................... 106/281 R; 106/273 R; 106/269
[58] Field of Search ............... 106/269, 273, 279, 280, 106/281; 208/44

[56] References Cited

U.S. PATENT DOCUMENTS

| | | | |
|---|---|---|---|
| 2,023,068 | 12/1935 | Flood | 106/269 |
| 2,339,853 | 1/1944 | Hemmer | 106/269 |
| 2,342,861 | 2/1944 | Hemmer | 106/269 |
| 3,868,263 | 2/1975 | McConnaughy | 106/281 |

*Primary Examiner*—Donald E. Czaja
*Assistant Examiner*—W. Thompson
*Attorney, Agent, or Firm*—Hosier, Niro & Daleiden

[57] ABSTRACT

A paving composition formed of aggregate mixed with substantially unblown asphalt cement (neither emulsified nor cut-back) including a soluble organic-manganese compound either alone or in combination with organic-cobalt or organic-copper compounds for improved strength. The composition is employed for paving roads by conventional techniques.

19 Claims, No Drawings

HIGH STRENGTH MODIFIED ASPHALT PAVING COMPOSITION

CROSS-REFERENCE TO RELATED APPLICATION

This application is a continuation-in-part of our co-pending application Ser. No. 780,862, filed Mar. 24, 1977, now abandoned and entitled HIGH STRENGTH MODIFIED ASPHALT PAVING COMPOSITION.

BACKGROUND OF THE INVENTION

The present invention relates to an improved asphalt-aggregate paving composition.

Aggregate-containing asphalt has been employed as the paving composition for roads or the like for many years. The asphalt includes bitumen as a predominant constituent and is conventionally obtained as a solid residue from the distillation of crude petroleum. The asphalt is converted to a fluid state when paving a road. One fluid form is the suspension or emulsion of the asphalt in water. After spreading and compressing the aggregate-containing asphalt, water evaporates and the asphalt hardens into a continuous mass. Another form of asphalt employed in road construction is a cutback, i.e., a liquid petroleum product produced by fluxing an asphaltic base with a suitable distillate. A road is formed by layering the cutback and evaporating the volatile distillate from the mass. The advantage of using the above road construction techniques is the avoidance of high temperature application. In an alternative technique, the asphalt and aggregate can be mixed and applied at elevated temperatures at the fluid state of the asphalt to form the road. This form of asphalt which is neither cut-back nor emulsified is referred to as asphalt cement.

A major problem with cutbacks and emulsions is their low adhesivity for aggregate in comparison to asphalt cement. This is due primarily to (a) the organic solvent or oil in the cutback and/or (b) the water in the emulsion or on the aggregate surface which interferes with the formation of an adhesive bond between the aggregate and asphalt. One technique which has been disclosed to increase such adhesivity is set forth in U.S. Pat. No. 2,342,861. The examples of that patent illustrate the addition of a lead soap, specifically lead oleate or naphthenate, to asphalt cutbacks or emulsions to increase their adhesivity for aggregate. Although in all illustrated examples only lead is disclosed as a metal soap to increase adhesivity, the patent suggests that other heavy metal salts of organic acids could be employed including the following metals: Fe, Al, Mn, Zn, Co, Ni, Sn, Ca, Sr, Ba, and Mg. The patent discloses a technique of forming the lead soap by heating a lead oxide in the presence of the desired organic acids. Such lead soaps are then added to the desired asphalt.

Heavy metal salts of high molecular weight organic acids, such as naphthenates or linoleates, have been employed to prevent cracking in blown or oxidized asphalt coatings. For example, U.S. Pat. No. 2,282,703 discloses the use of heavy metals such as cobalt, manganese, iron, lead, vanadium, or zinc dispersed into the blown asphalt for this purpose.

Heavy metal soaps have also been disclosed for use as a dispersant in roofing asphalts to prevent failure of the asphalt due to "alligatoring". U.S. Pat. No. 2,928,753 discloses the polyvalent metal salts of copper, cobalt, or manganese in combination with high molecular weight monocarboxylic acids such as oleic or naphthenic acid. The final disclosed product is an aggregate-free coating of 0.025 inches thick on an aluminum sheet heated so that leveling occurs.

In U.S. Pat. No. 1,328,310, an asphaltic pavement is disclosed in which copper sulfate is added to the asphalt for improved physical properties. Other compounds are disclosed including the sulfates or selenates of aluminum, chromium, manganese, iron, indium, gallium, and the sulfates or selenides of sodium potassium, rubidium, ammonium, silver, gold, platinum or thallium. These compounds are relatively insoluble in the asphalt.

In U.S. Pat. No. 1,505,880, copper slag is added with the aggregate to asphalt to increase the toughness of the resulting pavement composition.

In British Pat. No. 533,977, lead or iron double salts of organic acids are disclosed for the purpose of improving adhesivity of asphalt for mineral aggregate. Also disclosed, incidentally, is that other di- and multi-valent metals such as aluminum, chromium, copper and mercury can be used.

SUMMARY OF THE INVENTION AND OBJECTS

In accordance with the present invention, it has been found that dissolving certain organic-manganese compounds in asphalt cement and then mixing the same with aggregate forms a paving of vastly improved characteristics. In quantities as low as 0.01% to 0.5% by weight of the asphalt cement, manganese produces a significant increase in compressive, flexural and fatigue strength of the ultimate cured paved road.

The asphalt cement is fluidized by heating to a temperature above its melting or softening point and then the organic-manganese compound is added to it. The manganese ion-containing asphalt cement may then be mixed in this form directly with the aggregate for road construction. It has been found that the modified asphalt cement may be stored in bulk prior to road formation without substantial thickening.

It is an object of the invention to provide a modified asphalt cement-aggregate paving composition of exceptional strength and fatigue resistance for use in the formation of roads or the like.

It is a particular object of the invention to provide a modified asphalt cement which is of suitable viscosity in bulk for paving but which cures into an asphalt cement of exceptional strength after paving.

It is a further object of the invention to provide an asphalt cement-aggregate paving composition of superior Marshall stability.

It is a further object of the invention to provide a paving composition of the foregoing type which retains a large portion of its strength at elevated temperatures while forming a flexible pavement possessing self-healing properties.

It is another object of the invention to provide a method for modifying soft asphalt cement to form a pavement of upgraded physical properties.

It is an additional object to provide a paving composition which can employ inferior aggregates.

Further objects and features of the invention will be apparent from the following description of its preferred embodiments.

DETAILED DESCRIPTION OF THE PREFERRED EMBODIMENTS

The present invention relates to a modified asphalt cement which, combined with aggregate, forms a paving composition providing significantly improved physical properties. The asphalt cement is modified by dissolving a strength improving agent in the form of an organic-manganese compound in the asphalt cement while it is in a fluid state by heating. The manganese may be used in its different valence states (e.g., +2, +3, or higher). Mixtures of manganese with organic-cobalt or copper compounds, or other metal ions may also be used.

As used herein, the term "asphalt cement" refers to any of a variety of substantially unblown or unoxidized solid or semi-solid material at room temperature which gradually liquifies when heated. Its predominant constituents are bitumens, which are obtained as the residue of refining processing. The term excludes emulsions and cutbacks of the asphalt cement. Thus, it contains neither the water phase of the emulsion nor the extraneous petroleum solvents or oils commonly added to asphalt cement to convert it to a cutback. The asphalt cement is generally characterized by a penetration of less than 400 at 25 C., and a typical penetration between 40 and 300 (ASTM Standard, Method D-5). The viscosity of asphalt cement at 60° C. is more than about 65 poise.

It is important to dissolve the Mn ion of the present invention throughout the asphalt so that its strength improving effect is imparted to the final product in a consistent manner. For optimum dispersion, the Mn catalyst is in the form of an organic-Mn compound which is soluble in a significant portion of the asphalt. The organic compounds may be unsubstituted or substituted (e.g., with sulfur, particularly sulfonates, or with phosphorus, particularly, phosphates). Suitable anions for the organic-manganese compound are derived from carboxylic acids, alcohols, phenols, and ketones. Particularly good results are obtained with manganese (acetylacetonate)$_3$. Preferable anions include carboxylic acids, having up to about 30 carbon atoms in the chain such as acetates, linoleates, octoates, naphthenates, oleates, decanoates, stearates, and laurates, and mixtures thereof above or with other acids. It has been found that the anions derived from octoates, naphthenates and acetates are, by far, the most effective ones tested as they are the most soluble in the asphalt cement. Other carboxylic acids (e.g., of the tertiary type) may also be used. Such organic-manganese compounds are preferably added to the asphalt cement in a dilute volatile solution of organic solvent for improved dispersion and mixing. Typical dilutions are from 5 to 12 weight % of metal ion to total additive. Such levels of solvent are below 5 weight % of the asphalt cement, typically below 2%, well below the level of solvent in a cutback. In any event, applicant's volatile solvent would be vaporized at the temperature of mixing and so would not adversely affect adhesion.

Significant improvements in the modified asphalt are obtained by adding a relatively small quantity of the organic-manganese compound. Thus, a concentration of manganese ion as low as 0.01% by weight based on the asphalt yields a paving composition of improved compressive load strength. It has been found that optimum properties are obtained at a minimum of 0.05–0.5% by weight of manganese ion. Levels of Mn ion above such concentrations, say at 1%, produce only marginal improvements. For economy, the optimum range is from 0.05 to 0.20% by weight of total Mn based upon the asphalt.

The foregoing organic-Mn compounds are dissolved in the asphalt cement of the present invention by heating the asphalt to above its softening or melting point until it is sufficiently fluid to thoroughly disperse the metal organic-Mn compound for dissolution. This technique is designated "warm mixing" herein. The metal catalyst is preferably in a liquid form. For most conventional asphalt cements, a temperature for asphalt cement fluidizing is of at least 100° C., typically on the order of 110° to 120° C. to as high as 150° C. depending upon the type of asphalt. At such temperatures, the viscosity of the asphalt composition is sufficiently reduced to permit thorough dispersion and dissolution by manual mixing.

The warm mixing technique may be employed at a facility remote from the road construction site. This is possible because, as set forth herein, the organic-metal compound does not cure the asphalt cement while it is in bulk form. Thus, the modified asphalt cement can be stored in bulk until needed. In conventional processing, the modified asphalt cement is maintained in a fluid state from its time of formation, during normal storage and transport to the road site, during mixing with aggregate and until final paving. In an alternative to remote warm mixing, the organic-Mn compound could be added to the asphalt cement at the road construction site just prior to paving.

The modified asphalt is characterized by a viscosity in a fluid state state at the elevated temperature of road building comparable to conventional asphalt. However, as set forth below, the cured paved road has vastly superior strength in comparison to one formed with conventional asphalt cement.

Conventionally, the warm mixed modified asphalt in fluid form is premixed with preheated predried aggregate to form a homogeneous mixture of uniformly coated aggregate in a paving composition, typically in an asphalt mixing plant. The aggregate is preferably heated under conditions of time and temperature to drive off essentially all free moisture prior to mixing. During mixing, both the aggregate and asphalt cement are typically at a temperature of 100° C. to 160° C. Before the composition has cooled to a temperature at which it loses its fluidity, it is spread on the road bed and compacted. Then, the asphalt is permitted to cure. After curing, the road comprises aggregate bound by a matrix of modified asphalt binder.

It is noted that acceptable curing occurs at ambient temperatures, e.g., 22° C. Moderate elevations (e.g., to 50° C.) in the temperature of curing accelerates the process. However, very high temperatures such as employed to blow asphalt, i.e., on the order of 230° C., are unacceptable for the present process.

The aggregate of the present invention is suitably of a type employed in the road building industry. It may range from fine particles such as sand to relatively coarse particles such as crushed stone, gravel or slag.

A major portion by weight of aggregate is mixed with a minor portion by weight of asphalt cement. The ratio of aggregate to modified asphalt cement is that typical for road paving applications. Thus, a minimum of about 85% by weight of aggregate and generally about 90 to 96% by weight of the total paving composition is employed in the present invention.

As set forth in the background of the invention, heavy metal soaps have been employed in combination with asphalt for a number of different purposes. For example, they have been used for avoiding cracking in blown asphalt, and preventing alligatoring in roofing materials. Also, such metal soaps have been disclosed for use in road building compositions of aggregate and asphalt cutbacks or emulsions to improve the poor adhesivity of the asphalt in these forms for the aggregate. The prior art teaches the general equivalency of multivalent heavy metal ions for this purpose. For example, in the aforementioned U.S. Pat. No. 2,342,861, experiments were performed employing lead soaps to increase adhesivity of asphalt for aggregate. In accordance with the state of the art, the patent asserts that other metals such as iron, aluminum, manganese, zinc, cobalt, nickel, tin, calcium, strontium, barium, or magnesium could also be employed for the same purpose. There is no disclosure in the prior art that any of such heavy metals would serve any function in the warm mix technique using asphalt cement for forming a paving composition.

With the above background knowledge, it has unexpectedly been found that addition of manganese to asphalt cement serves to improve to a major extent, the strength, temperature susceptibility and other properties of an aggregate-containing paving composition using that modified asphalt cement. It has been found that manganese, alone or in combination with copper or cobalt, is vastly superior to the remainder of the heavy metals for this purpose. Manganese provides, by far, the most exceptional properties and is readily available.

It has been discovered further that the use of cobalt in addition to manganese produces a synergistic increase in strength of a paved layer in comparison to manganese or cobalt alone. Cobalt at concentrations as low as 0.0001% by weight based on the asphalt produces benefits while exceptional benefits are obtained at concentrations of 0.001 to 0.2 weight % when used in combination with the foregoing ratio of manganese to asphalt cement.

One advantage of using the metal ions of the present invention is the ability to form high strength roads from relatively soft asphalt cements (e.g., one characterized by a penetration as high as 350–400 or less).

It is believed that the extraordinary increases in the flexural strength and fatigue resistance of the foregoing modified asphalt-aggregate cured composition may be explained in accordance with the following theory. It is well known that asphalt cement contains a large number of compounds (e.g., tetralin or tetralin-like structures) that are readily autoxidized. Based on experimentation, it is believed that manganese causes the formation of a diketone of tetralin (1,4 diketo tetralin) which then forms stable, chemically resistant complexes with the metal. These complexes tie together asphalt molecules to cause vast increases in strength of the resulting asphalt-aggregate composition compared to ones formed in the absence of metal.

It has been found that the modified asphalt of the present invention does not harden or cure when in bulk form. It remains at a viscosity at elevated temperatures above its melting point comparable to unmodified asphalt. Thus, the manganese ion only functions to cause curing of the asphalt after mixing with aggregate. It is believed that this phenomenon may be explained by the requirement that the modified asphalt be in a releatively thin film, the state in which it exists in combination with aggregate. Thus, the asphalt tends to form a thin coating of 5–10 microns on the surface of the aggregate. Although the maximum thickness of the thin film is not known, it is believed that the film may be as thick as 150 microns or more. An explanation for the requirement of the asphalt to be in a thin film form is that a certain amount of oxygen is required to penetrate throughout the film to permit the foregoing complexes to occur.

It has been found that increasing the void ratio of the modified asphalt-aggregate composition causes a corresponding increase in the curing rate. This is consistent with the theory that a certain amount of oxygen penetration of the asphalt is required to form the foregoing complexes. Thus, at a 20% void ratio in a sand aggregate composition, significant curing can occur in a week. A typical road has a void ratio on the order of 5–10% which is sufficient for the benefits of the present invention.

A further disclosure of the nature of the present invention is provided by the following specific examples of the practice of the present invention. It should be understood that the data disclosed serve only as examples and are not intended to limit the scope of the invention.

EXAMPLE 1

Comparative tests were performed with various transition heavy metals as additives to asphalt cement. In each instance, sand of the AASHTO A-3 classification, a dune sand, was mixed with a modified bitumen asphalt cement designated AR-8000 by the Asphalt Institute in a ratio of 4 parts by weight of modified asphalt to 100 parts by weight of sand. The modified asphalt in each instance included organic-metal compounds (soaps of napthenates or octoates) in a ratio so that the metal was present at 0.2% by weight of the asphalt. The soaps, in liquid form, were mixed with the fluid asphalt at elevated temperatures (about 110°–120° C.) sufficient to melt the asphalt. Mild manual stirring of the mixture was employed to thoroughly disperse the metal throughout the asphalt for dissolution.

The asphalt and sand were formed into short miniature cores at 154°–158° C. and molded at that temperature. Then, the cores were cured at 50° C. for seven days. The cores were tested for compressive strength at both 22° C. and 50° C. The same cores were re-tested under the same conditions after two weeks. The cores of the second test were slightly larger in diameter so the results should be multiplied by approximately 0.97 for correction. The results of the tests are set forth in the following table.

TABLE I
RESULTS:

| | | Load, Pounds, after 1 Week at 50° C. | | | |
|---|---|---|---|---|---|
| Metal | Cure | 22° C. Test | | 50° C. Test | |
| Catalyst | | Open | Enclosed | Open | Enclosed |
| Manganese | | 1,050 | 972 | 366 | 310 |
| Copper | | 642 | 642 | 133 | 104 |
| Cobalt | | 756 | 835 | 120 | 89 |
| Rare Earths | | 505 | 529 | 27 | 28 |
| Iron | | 468 | 428 | 22 | 18 |
| Zirconium | | 224 | 220 | 7 | 5 |
| Nickel | | 171 | 161 | 6 | 5 |
| Calcium | | 152 | 117 | 2 | 2 |
| Zinc | | 123 | 127 | 3 | 2 |
| Lead | | 116 | 111 | 2 | 1 |

| | | Load, Pounds, after 2 Weeks at 50° C. | | | |
|---|---|---|---|---|---|
| Metal | Cure | 22° C. Test | | 50° C. Test | |
| Catalyst | | Open | Enclosed | Open | Enclosed |
| Manganese | | 1,188 | 1,188 | 294 | 290 |
| Copper | | 932 | 976 | 152 | 146 |
| Cobalt | | 910 | 956 | 88 | 72 |
| Rare Earths | | 654 | 677 | 20 | 23 |
| Iron | | 620 | 586 | 17 | 18 |
| Zirconium | | 273 | 289 | 4 | 2 |
| Nickel | | 401 | 395 | 8 | 7 |
| Calcium | | 294 | 253 | 4 | 4 |
| Zinc | | 273 | 254 | 4 | 2 |
| Lead | | 243 | 257 | Nil | Nil |

The columns designated "enclosed" indicate that the compositions were cured in containers to eliminate most but not all oxygen contact. The compressive strengths of the partially enclosed and totally exposed samples are comparable indicating that there is no significant effect in a partial restriction of oxygen supplied to the core during curing.

It is apparent from Table I that manganese, by far, is the preferred metal organic compound for all tests. However, copper and cobalt also provided extraordinary increases in structural strength in comparison to the remainder of the tested metals.

EXAMPLE 2

A series of tests were performed on the basic paving composition of Example 1 but using only manganese octoate at 0.2% of the total asphalt. The same amount of asphalt and sand aggregate was used. The results of the above test are summarized in the below table. All samples were cured at 50° C. for one week exposed to the air. Similar results are obtained at lower ambient temperatures (e.g., 22° C.) at increased curing times.

TABLE II

| | Unmodified Asphalt | Modified Asphalt |
|---|---|---|
| Unconfined Compression Test: | | |
| strength at 22° C., kg/cm$^2$ | 8.4 | 63.2 |
| strength at 50° C., kg/cm$^2$ | 0.3 | 20.3 |
| Marshall Stability Test: | | |
| stability, lb. | 250 | 1800 |
| flow, 1/100 inch | 14 | 12 |
| Static Flexural Test: | | |
| modulus of elasticity, kg/cm$^2$ | 780 | 5175 |
| modulus of rupture, kg/cm$^2$ | 3.4 | 17.3 |
| ultimate strain ($\times 10^{-4}$) | —* | 152 |
| Dynamic Fatigue Tests: | | |
| modulus of elasticity, kg/cm$^2$ | —* | 60,000 |
| endurance limit, e $\times 10^{-6}$ | —* | 80 |

*These quantities could not be determined for untreated sand-asphalt beams.

It was found that full strength at 22° C. testing temperataure was obtained in about four weeks, although a longer period of time was required for full strength at a 50° C. test temperature.

The mode of failure was of a plastic nature. The "failed" specimens could be retested several times within relatively short periods of time (e.g., one or two days) and still yield about the same strength. This indicates a combination of plastic flow and thixotropic behavior, hence, a retention of strength near the peak point, and a healing action beyond.

The Marshall stability test revealed the stability increased at a decreasing rate beyond one month.

The static flexure tests were performed by molding beams measuring 25 cm in length, 2 cm × 3 cm in cross-section. The beams were cured at 22° C. for about one month, and were then tested in static flexure in third-point loading, over a clear span of 22 cm. The rate of loading was 0.05 inches per minute, and the temperature at test was 22° C. The results are set forth in the above table. The ultimate flexural strain of the unmodified asphalt-sand beam could not be obtained because it formed continuously for the duration of the test. The modified asphalt beam ultimate strength was approximated by adding the elastic strain near the ultimate load to its plastic strain at rupture.

Beams of the foregoing type was tested in a dynamic fatigue machine supported over a span of 22 cm loaded repeatedly at their mid-point. A steel leaf was placed crosswise under the beams to push them back up each time the load was removed. The rate of loading was three repetitions per minute, and the temperture at test was 22° C.

In performing the fatigue test, no meaningful results could be obtained for the unmoldified asphalt beams as they deformed both vertically and laterally under relatively low levels of load. The results of the fatigue test were plotted on a log-log scale to yield an equation in the standard form $N_f = K(1/e)^c$ wherein $N_f$ is the number of load repetitions to failure, e is the corresponding flexural strain, and K and c are regression constants. K and c were found to be $1.82 \times 10^{12}$ and 3.29, respectively, where e is expressed in micro units.

The dynamic modulus of elasticity of the sand-asphalt beams was found to be on the order of 850,000 psi. At this modulus, the modified asphalt-sand product was upgraded to the level of asphaltic concrete in fatigue life.

EXAMPLE 3

Mixes were made of asphalt plus 0.05%, 0.1% and 0.2% manganese. Standard Marshall cores of asphaltic concrete were molded at 4% bitumen. Half the cores at each level of manganese were put into a 50° C. oven. The other half were left on the bench. At 7 days of cure time, Marshall Stability Tests were run. The results are set forth in Table III below.

TABLE III

| Cure and Test | Manganese in Asphalt | | |
|---|---|---|---|
| | 0.05 | 0.10 | 0.20 |
| 22° C. cure, Marshall Stability (lbs.) | 370 | 1030 | 1140 |
| 50° C. cure, Marshall Stability | 1288 | 2690 | 3220 |

A graph of this data indicates that the maximum beneficial effect on stability per unit quantity of manganese is between 0.08% and 0.12%. Levels of manganese above this produce higher stability, but less stability per unit of manganese.

EXAMPLE 4

A series of tests were performed to illustrate the significant increases in strength accorded to cores in which a small amount of cobalt, together with manganese, was added to the asphalt. In addition, the relative strengths obtained with manganese, cobalt, copper and iron are compared.

The organic-metal compounds used were of the following type:
  manganese napthenate (6% manganese),
  cobalt napthenate (6% cobalt),
  copper napthenate (8% copper), and
  iron napthenate (6% iron).

Bitumen (Dutch 80/100 penetration) was heated to 100° C. and the foregoing metal compounds were added and dissolved throughout the bitumen. Then, the procedure of Example 1 was employed to form short Harvard miniature cores molded at 4% bitumen. All of the cores were cured at 45° C. until their test date. Each core was tested for compressive strengths at 45° C., held at 45° C. for at least one hour, and then cooled for at least 1.5 hours to room temperature and re-tested at that temperature.

The results of the above tests are set out in Table IV below.

TABLE IV

| Test Temp. °C. | Metal Iron | Unconfined Compressive Strengths (kg/cm²) | | | |
|---|---|---|---|---|---|
| | | 3 day | 7 day | 14 day | 28 day |
| 45 | Mn (0.2%) + Co (0.227%) | 8.02 | —9.68 | 12.21 | 12.68 |
| 45 | Mn (0.2%) + Co (0.038%) | — | 7.00 | 6.66* | 7.55 |
| 45 | Mn (0.2%) + C. (0.006%) | — | 5.54 | 6.07 | 7.57 |
| 45 | Mn (0.2%) + Co (0.001%) | 3.85 | 4.31 | 4.99 | 8.04 |
| 45 | Mn (0.2%) | 4.10 | 4.62 | 5.23 | 6.28 |
| 45 | Co (0.2%) | 3.64 | 3.24 | 2.61 | 3.30 |
| 45 | Cu (0.2%) | 2.42 | 2.32 | 1.81 | 2.30 |
| 45 | Fe (0.2%) | 0.71 | 0.64 | 0.67 | .1.22 |
| 22 | Mn (0.2%) + Co (0.227%) | 13.99 | 15.91 | 19.81 | 21.24 |
| 22 | Mn (0.2%) + Co (0.38%) | — | 14.28 | 16.43* | 15.95 |
| 22 | Mn (0.2%) + Co (0.006%) | — | 12.43 | 14.22 | 14.96 |
| 22 | Mn (0.2%) + Co (0.001%) | 9.15 | 11.62 | — | 15.88 |
| 22 | Mn (0.2%) | 10.47 | 10.97 | 15.22 | 16.20 |
| 22 | Co (0.2%) | 10.38 | 10.99 | 10.38 | 10.04 |
| 22 | Cu (0.2%) | 6.12 | 7.34 | 8.15 | 8.76 |
| 22 | Fe (0.2%) | 3.76 | 4.07 | 4.73 | 7.21 |

*Tested at 15 days, not 14 days.

It is apparent from the foregoing Table that cobalt at low levels produces a substantial increase in strength of the composition at the elevated temperture of 45° C. This is an important test as the asphalt is weakest at elevated temperatures. At 28 days, the composition containing 0.2% manganese and 0.001% cobalt produced a strength of 8.04 compared to 6.28 for manganese alone. This is nearly a 30% increase in strength by an increase of only 0.5% of total metal ion concentration.

Another feature of the foregoing Table are the far superior results of manganese in comparison to the remainder of the metal ions at 28 days in the 45° C. temperature test.

EXAMPLE 5

Another comparative test was performed to illustrate the importance of using the manganese in a soluble metal organic compound form in comparison to an inorganic insoluble form such as manganese sulfate. For this purpose, manganese napthenate was compared against manganese sulfate.

The manganese (in napthenate and sulfate form) were added to asphalt (AR-4000 asphalt, Chevron) mixed as set out in the previous examples. Then cores were formed using 5.2% of such modified asphalt and Iraq sand. The cores were cured at 45° C. for 8 days and then tested in unconfined compression at 22° C. and 45° C. The results are set out in Table V below.

TABLE V

| Treatment | Compressive Strength (kg/cm²) | |
|---|---|---|
| | 45° C. | 22° C. |
| Untreated | 1.05 | 7.78 |
| 0.2% Manganese napthenate | 14.70 | 24.89 |
| 0.2% Manganese sulfate | 2.37 | 13.64 |

It is apparent from the foregoing that at 45° C., then core using asphalt treated with manganese napthenate was over 6 times stronger than that treated with manganese sulfate and was 14 times stronger than the untreated asphalt derived core. The above Table illustrates the importance of adding the manganese to the asphalt in a soluble form.

EXAMPLE 6

Materials Used (Iraq) sand p1 AR-4000 (Chevron) bitumen
manganese acetate
manganese acetyl acetonate, Mn (AcAc)$_2$
manganese acetyl acetonate, Mn (AcAc)$_3$
manganese benzoate
manganese para-toluate
manganese naphthenate
manganese octoate The manganese compound was added to the bitumen to produce 0.2% manganese added. This was stirred in at 110° C. In the cases of the acetyl-acetonate, the benzoate and the toluate, the solids did not dissolve readily. These were further heated and stirred at 120° C. and 135° C. before mixing with the sand. Microscopic examination still indicated varying amounts of particulate matter in the bitumen.

The sand-asphalt was mixed and compacted into short miniature cores at 135° C.-140° C. These were cured at 45° C. Two cores were tested for compressive strength at 7 days. The remaining 4 were tested at 14 days.

TABLE VI

| | Bitumen at 5.2% of sand weight. | | | |
|---|---|---|---|---|
| Treatment | Mn in Bit., % | Cure Days | Strength, at 45° C. | Kg/cm² at 22° C. |
| None | 0.00 | 8 | 1.05 | 7.78 |
| Mn Naphthenate | 0.2 | 7 | 14.70 | 22.75 |
| " | 0.2 | 14 | 16.08 | 24.89 |
| Mn Acetate | 0.2 | 7 | 9.80 | 29.95 |
| " | 0.2 | 14 | 17.05 | 33.74 |
| Mn (AcAc)$_2$ | 0.2 | 7 | 1.04 | 9.72 |
| " | 0.2 | 14 | 1.70 | 14.69 |
| Mn (AcAc)$_3$ | 0.2 | 7 | 19.76 | 35.59 |
| " | 0.2 | 14 | 20.92 | 38.24 |

TABLE VII

| | Bitumen at 4.8% of sand weight. | | | |
|---|---|---|---|---|
| Treatment | Mn in Bit., % | Cure Days | Strength at 45° C. | Kg/cm² at 22° C. |
| None | 0.00 | 7 | 0.68 | 7.62 |
| Mn Naphthenate | 0.10 | 7 | 11.25 | 21.94 |
| " | 0.10 | 14 | 16.08 | 23.94 |
| Mn Octoate | 0.10 | 7 | 8.79 | 24.51 |
| " | 0.10 | 14 | 14.15 | 23.69 |
| Mn Benzoate | 0.10 | 7 | 0.87 | 9.45 |
| " | 0.10 | 14 | 1.89 | 13.78 |
| Mn p-Toluate | 0.10 | 7 | 1.80 | 11.20 |
| " | 0.10 | 14 | 2.33 | 15.03 | the acetyl acetonate (Mn+++) and the acetate (Mn++) were highly effective at increasing the strength. These tests support the conclusion that multiple forms of manganese (at least +2 and +3) will be effective to the extent that it is soluble in bitumen and can be dissolved (or ionized).

EXAMPLE 7

Materials Used

Local aggregate*
Australian 80/100 penetration bitumen, R-90
manganese naphthenate (6% mN) manganese octoate** (12% Mn)
manganese octoate and cobalt naphthenate for Australian.

*The aggregate was 1023 gms of ½-¼", 825 grams of ¼-#16 and 1452 gms of #16-dust for each set of 3 cores. To this 3300 gms of aggregate, 180 gms of the bitumen (treated or untreated) was added. Cores were mixed 3 at a time and molded at 140° C.
**Supplied by Tenneco under the trademark Tenneco—includes minor amounts of other acid radicals (e.g., C$_9$, C$_{10}$).

Mn Maphthenate was used for the 0.025% Mn treated bitumen and the Mn Octoate for the 0.05% and 0.075% Mn treated bitumen. The 0.108% metal treated bitumen was treated with a mixture of manganese octoate (9% Mn) and cobalt naphthenate (6% Co). This material was 0.098% Mn and 0.0097% Co. All cores were cured at 45° C. until tested for Marshall Stability.

TABLE VIII

| Treatment Material | Metal % | Cure, Months | Marshall Stability Pounds | Flow 1/100 In. | Gain % |
|---|---|---|---|---|---|
| None | 0.000 | 0.5 | 2089 | 12.3 | 0.0 |
| None | 0.000 | 3.4 | 2929 | 11.4 | 0.0 |
| Mn Naphthenate | 0.025 | 0.5 | 2810 | 16.4 | 35 |
| " | " | 1.0 | 2812 | 12.8 | 26 |
| " | " | 3.0 | 3014 | 11.3 | 71 |
| Mn Octoate | 0.050 | 0.5 | 2825 | | 35 |
| " | " | 1.0 | 2411 | 11.9 | 8 |
| " | " | 3.0 | 2928 | 12.7 | 4 |
| Mn Octoate | 0.075 | 0.5 | 2869 | 11.6 | 37 |
| " | " | 1.0 | 2682 | | 20 |
| " | " | 3.0 | 3454 | 13.4 | 23 |
| Mn Octoate + Cobalt Naphthenate (10:1) | 0.108 | 1.0 | 4148 | 15.9 | 99 |
| Mn Octoate + Cobalt Naphthenate (10:1) | 0.108 | 2.0 | 4613 | 16.1 | 83 |

EXAMPLE 8

Materials Used

Iraq sand
sand (AASHTO A-3 classification)
Chevron AR-4000 Bitumen
Australian R-90 Bitumen
manganese naphthenate (6% Mn)
manganese benzoate (crystal)
manganese para-Toluate (crystal)
manganese octoate (6% Mn)
manganese neo-Decanoate Bitumen was weighed into small sample cans at 110° C. or less. The manganese compound was added to produce the level of manganese in the bitumen shown in Table IX. The mix was reheated and stirred until a thorough dispersion was accomplished. The sample was then heated to 140°-144° C. and weighed into the preheated sand to produce the level of bitumen percentage reported in Table IX.

Short Harvard Miniature cores were molded, also at 140°-144° C., and cured at 45° C. Cure times are listed in Table VII. Cores were tested in compression, half of them at 45° C. and the remainder at 22° C.

The cores containing neo-Decanoate were cured at 50° C.

TABLE IX

| Bitumen | Bitumen % | Treatment | Metal as % of Bit. | Cure, Days at 45° C. | Strength at 45° C. | Kg/cm² at 22° C. |
|---|---|---|---|---|---|---|
| AR-4000 | 4.6 | None | — | 14 | 45° | 0.68 | 7.62 |
| AR-4000' | 5.2 | None | — | 14 | 45° | 1.05 | 7.78 |
| AR-4000 | 4.6 | Mn Naph. | 0.10 | 7 | 45° | 11.25 | 21.94 |
| AR-4000 | 4.6 | Mn Naph. | 0.10 | 14 | 45° | 16.08 | 23.34 |
| AR-4000 | 5.2 | Mn Naph. | 0.20 | 8 | 45° | 14.70 | 24.89 |
| AR-4000 | 4.6 | Mn Benzoate | 0.10 | 7 | 45° | 0.80 | 7.69 |
| AR-4000 | 4.6 | Mn Benzoate | 0.10 | 14 | 45° | 1.89 | 13.78 |
| AR-4000 | 4.6 | Mn Toluate | 0.10 | 7 | 45° | 1.87 | 13.87 |
| AR-4000 | 4.6 | Mn Toluate | 0.10 | 14 | 45° | 2.33 | 15.03 |
| AR-4000 | 4.6 | Mn Octoate | 0.10 | 7 | 45° | 8.79 | 24.51 |
| AR-4000 | 4.6 | Mn Octoate | 0.10 | 14 | 45° | 14.15 | 23.69 |

The data shown above were all produced in short miniature, sand-asphalt cores using a sand from Iraq.
The following are data from a Shayba sand:

| Aust.R-90 | 5.0 | None | — | 7 | 50° | 0.17 | 2.81 |
| Aust.R-90 | 5.0 | Mn Neo Decanoate | 0.20 | 7 | 50° | 4.22 | 11.72 |

It is apparent that all of the different acid salts of manganese provide improved strength, especially at higher temperatures. The differences in effect are believed to be due to the relative solubilities of the different salts.

What is claimed is:

1. A paving composition comprising at least 85 percent by weight aggregate, substantially unblown and unoxidized asphalt cement which is neither cut-back nor emulsified and which has bitumens as its predominant constitutent, and a strength improving agent comprising an organic manganese compound, either alone or in combination with organic-cobalt or organic-copper compounds, said strength improving agent being present in a form sufficient to make it substantially soluble in said asphalt cement and in an amount sufficient to provide manganese, manganese and cobalt or manganese and copper ion concentrations, based upon the total weight of said ions, in the range of about 0.01 to 0.50 percent by weight of said asphalt cement.

2. The paving composition of claim 1 in which said asphalt cement is further characterized by a penetration of less than about 400 measured at 25° C. and a viscosity at 60° C. of more than about 65 poise.

3. The paving composition of claim 1 in which the concentration of aggregate is between about 90 and 98 percent by weight of said paving composition.

4. The paving composition of claim 1 in which said strength improving agent is an organic-manganese compound present in a form capable of providing substantially soluble manganese ions in said asphalt cement and in an amount sufficient to provide manganese ion concentrations in the range of about 0.01 to 0.50 percent by weight of said asphalt cement.

5. The paving composition of claim 4 in which the concentration of manganese ions is between about 0.05 and 0.20 percent by weight of said asphalt cement.

6. The paving composition of claim 4 in which said strength improving agent also includes an organic-cobalt compound.

7. The paving composition of claim 6 in which said organic-cobalt compound is present in the amount of about 0.001 to 0.2 percent by weight of said asphalt cement.

8. The paving composition of claim 1 in which the anion for the organic-manganese, organic-cobalt and organic-copper compounds are derived from an organic compound selected from the group consisting of carboxylic acids, ketones, sulfonates and phosphates.

9. The paving composition of claim 8 in which said anion is derived from a carboxylic acid.

10. The paving composition of claim 9 in which said anion is derived from a carboxylic acid having between about 1 and 30 carbon atoms.

11. A strength improving agent for a paving composition that includes at least 85 percent by weight aggregate and substantially unblown asphalt cement which is neither cut-back nor emulsified, said agent comprising organic-manganese either alone or in combination with an organic-cobalt compound, uniformly dissolved in said asphalt cement and present in an amount sufficient to provide a concentration of manganese or manganese and cobalt ions in the range of about 0.01 and 0.5 percent by weight of said asphalt cement.

12. The strength improving agent of claim 11 wherein said organic-manganese compound is present in the amount of about 0.08 to 0.12 percent by weight of said asphalt cement and said organic-cobalt compound is present in the amount of about 0.001 to 0.2 percent by weight of said asphalt cement.

13. The strength improving agent of claim 12 in which said organic-manganese compound is selected from the group consisting of manganese napthenate, manganese acetate, manganese acetyl acetonate, and manganese octoate, and said organic-cobalt compound is cobalt naphthenate.

14. A method of forming a paving composition comprising the steps of:

(a) dissolving at an elevated temperature a paving composition strength improving agent in substantially unblown fluid asphalt cement which is neither emulsified nor cut-back, said strength improving agent comprising an organic-manganese compound either alone or in combination with organic-cobalt or organic-copper compounds, said agent being present in a form soluble in the asphalt cement, the combined concentrations of said manganese, manganese and cobalt and manganese and copper ions comprising about 0.01 to 0.5 percent weight of said asphalt cement, and (b) mixing said manganese, manganese and cobalt or manganese and copper ion-containing asphalt with at least 85 weight percent of aggregate at an elevated temperature to form a paving composition.

15. The method of claim 14 in which said elevated temperature of step (b) is at least 100° C.

16. The method of claim 14 in which the anion is derived from an organic compound selected from the group consisting of carboxylic acids, ketones, sulfonates and phosphates.

17. The method of claim 14 in which the anion of said organic-metal compound is derived from carboxylic acid.

18. The method of claim 14 in which said asphalt cement is characterized by a penetration of less than about 400 measured at 25° C. and a viscosity at 60° C. of more than about 65 poise.

19. The method of claim 14 in which said strength improving agent is the combination of organic-manganese and organic-cobalt compounds, wherein the concentration of said organic-cobalt compound is between about 0.001 and 0.2 percent by weight of said asphalt cement, and the concentration of said organic-manganese compound is between about 0.05 and 0.20 percent by weight of said asphalt cement.

* * * * *